United States Patent Office 3,177,189
Patented Apr. 6, 1965

3,177,189
POLYMERIZATION PROMOTER
Robert Fuhrmann, Dover, and Fred W. Koff, Clifton, N.J., assignors to Allied Chemical Corporation, New York, N.Y., a corporation of New York
No Drawing. Filed Jan. 27, 1961, Ser. No. 85,190
10 Claims. (Cl. 260—93.7)

This invention relates to a catalyst and a process for the polymerization of alpha-olefins to solid polymers of high stereoregularity, and more particularly to the polymerization of propylene using said catalyst.

The use of certain "onium" compounds as modifiers of stereospecific catalysts for the polymerization of alpha-olefins has been disclosed by Ziegler and Montecatini in Australian patent application 40,207, dated August 5, 1958. Those compounds possess the general formula

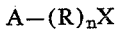

in which A represents an element selected from the Group V B or VI B of the Periodic Table, R stands for alkyl, aryl and aralkyl of identical or mixed nature ($n$ being 4 when A is a member of Group V B and 3 when A is an element of Group VI B), and X is a halogen atom.

These compounds are said to increase the rate of polymerization and in some cases the stereospecificity of the catalyst by several units percent, e.g. to a maximum of 88.3 percent for tetrabutyl ammonium iodide.

We have found that 2-oxo-morpholinium halides of the formula

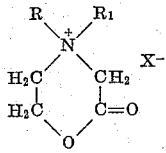

wherein R and $R_1$ are like or different aliphatic or aromatic hydrocarbon radicals containing from one to twenty carbon atoms, and X is a halide selected from the group consisting of iodide, bromide, chloride and fluoride, not only greatly increases the polymerization rate of alpha-olefins when used in conjunction with the catalytic complex, alpha-$TiCl_3 \cdot Al(alkyl)_3$, but also produces polymers which are at least 94-95 percent stereoregular. The efficacy of this catalyst is extremely surprising, since one would expect the carbonyl group of the oxo-morpholinum halide to be reduced by the trialkly aluminum cocatalyst. Such a redox reaction would be expected to render the catalyst useless.

The production of polymers with such high stereoregularity presents an important advantage in that one does not need to refine the polymer in order to remove its amorphous contents. In an unrefined polymer of low stereoregularity, the amorphous components tend to pass into solution and thereby increase the viscosity of the mixture. This produces a sticky end product which is difficult to handle and must therefore be refined.

Preferred are those 2-oxo-morpholinium halides in which the N-substituted groups are either aryl, aralkyl, branched or straight chain hydrocarbon radicals containing from 1 to 10 carbon atoms per radical.

Examples of 2-oxo-morpholinum halides which are suitable as promoters for the polymerization of alpha-olefins to stereospecific polymer are set forth in the following list of compounds, wherein the halide may be a member selected from the group consisting of iodide, bromide, chloride, and fluoride:

N-ethyl,N-cyclohexyl-2-oxo-morpholinium halide
N-butyl,N-cyclohexyl-2-oxo-morpholinium halide
N-ethyl,N-phenyl-2-oxo-morpholinium halide
N-butyl,N-phenyl-2-oxo-morpholinium halide
N-ethyl,N-benzyl-2-oxo-morpholinum halide
N-butyl,N-benzyl-2-oxo-morpholinium halide
N,N-diethyl-2-oxo-morpholinum halide
N-ethyl,N-isobutyl-2-oxo-morpholinium halide
N-neopentyl,N-ethyl-2-oxo-morpholinium halide The titanium chloride used as one ingredient of our catalyst is preferably alpha-$TiCl_3$, i.e., the violet crystalline form of titanium chloride obtainable by reduction of titanium tetrachloride with hydrogen; by reduction of titanium tetrachloride with titanium metal powder, by reduction of titanium tetrachloride with an aluminum trialkyl followed by heating the reaction product under nitrogen, e.g., to 300°; etc. However, other forms of $TiCl_3$ such as beta, gamma and delta, are useful for the rapid polymerization of alpha-olefins to highly stereoregular polymers.

Preferred alkyl aluminum compounds to be used as ingredients of our catalyst are aluminum trialkyls having 1-4 carbon atoms in the alkyl groups such as trimethyl aluminum, triethyl aluminum and triisobutyl aluminum. The stereoregularity of propylene polymers produced with either triethyl or triisobutyl aluminum cocatalysts is of the order of 95 percent, whereas in the presence of trimethyl aluminum, nearly 100 percent stereoregularity is obtained.

Organometallic compounds in which the metal is other than aluminum, can also be used in this process. Both dialkyl zinc and dialkyl cadmium may be used, and they will provide effective control on the molecular weight of the polymer, i.e., they will lower it.

These catalytic ingredients are contacted generally in an inert reaction medium such as pentane, hexane, heptane and isooctane. The trialkyl aluminum compound is soluble in such solvents, and $TiCl_3$ can be suspended as a fine powder in the solvent. The trialkyl aluminum concentration can range from 5 to 100 millimoles per liter. Within this range increasing trialkyl aluminum concentration results in increasing rates of polymerization accompanied by the formation of polymers of decreasing molecular weight. The stereoregularity of the polymers, however, remains uniformly high throughout. It is only at exceptionally high trialkyl aluminum concentrations beyond the upper limits of this range that the stereoregularity of the polymers begins to decrease. A trialkyl aluminum concentration of 20 to 60 millimoles per liter is especially preferred.

In contrast thereto, the $TiCl_3$ concentration is not critical. Concentrations of this compound can range from 0.1 gram per liter upward to such concentrations that the reaction becomes difficult to control because of exothermic effects.

Referring now to the proportions of the 2-oxo-morpholinium halide promoter to be used in making up our catalyst, we have found that at least under the generally used polymerization conditions there is a preferred molecular ratio of 2-oxo-morpholinium halide to be used in the catalyst per molecular proportion of trialkyl aluminum therein. The preferred ratio of trialkyl aluminum to 2-oxo-morpholinium halide promoter is in the range from 60:1 to 5:1. The ratio of trialkyl aluminum to promoter may be as high as 100:1. Polymerization will also occur at ratios as low as 1:1, but for ratios lower than this, no polymerization of alpha-olefins occurs.

The catalyst described hereinabove is capable of polymerizing alpha-olefins of the general formula

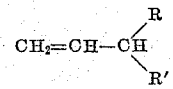

in which R and R' are hydrogen, alkyl, cycloalkyl, aralkyl or aryl.

The order of addition of the catalytic components and promoter in forming our catalyst is not controlling upon the effectiveness thereof, but when using catalysts of this same general type we have observed best reaction rates upon adding the TiCl₃ ingredient to a reaction mixture already containing trialkyl aluminum and a 2-oxo-morpholinium halide as compared to adding the trialkyl aluminum ingredient last.

The following examples describe specific embodiments of our modified catalyst and of a process of making it and of polymerizing alpha-olefins therewith, and are representative of the best mode contemplated by us of carrying out our invention. Nevertheless the examples are to be understood as illustrative only and the invention is not to be understood as confined to all details of the examples.

Except as otherwise indicated in the examples the procedure used was as follows:

A three-necked flask equipped with a mechanical stirrer, gas inlet tube, thermometer and reflux condenser was thoroughly dried. The flask was then flushed with 99.9 percent pure propylene gas which was devoid of oxygen or any oxides. Continuing the flow of propylene, 350 ml. of n-heptane was introduced and became saturated with propylene. N,N-diethyl-2-oxo-morpholinium chloride was next introduced, followed by the alpha-TiCl₃ in 50 ml. of the liquid medium, and then by the triethyl aluminum. The reaction temperature was maintained at 70° C. by a water bath and the reaction time was counted from the introduction of the trialkyl aluminum to stopping the flow of propylene through the reaction medium containing the catalyst and promoter.

For determining reaction rates and composition of the polymer at the end of the desired reaction period, the contents of the flask were mixed with 1500 ml. of methanol. The insoluble polymer was filtered from the liquid and refined. To this end the polymer was simmered with 20 grams of a 5–10 percent solution of concentrated (33 percent) aqueous HCl in methanol for every one gram of the polymer. The polymer was filtered off and simmered three times in about 20 grams methanol for every one gram of polymer for 30 to 60 minutes. After each of these treatments the solid polymer was filtered off. The polymer recovered from the final simmering step was dried in a current of air at room temperature.

The stereoregular polypropylene fraction of the refined, dried polymer was separated by first extracting with boiling ethyl ether and then with boiling n-heptane. The residue of these extractions is the stereoregular form. These extractions were carried out in a Walker-Bailey extractor operating over a period of 24 hours for each extraction.

Reaction rates are expressed in the examples in terms of (grams polymer/gram TiCl₃ in catalyst)/hour.

Atmospheric pressures were maintained in these experiments.

| Example | g., alpha-TiCl₃ | Al/Ti/Di-ethyl-2-oxo-morph. cl., Mol Ratio | Polym. Temp., °C. | Polym. Time, Hrs. | Rate, g./g./hr. | Percent Stereo-regularity |
|---|---|---|---|---|---|---|
| 1 | 0.40 | 3:1:0.10 | 70 | 8 | 46.1 | 94.4 |
| 2 | 0.44 | 3:1:0.05 | 70 | 8 | 53.5 | 94.7 |

While the above describes the preferred embodiments of the invention, it will be understood that departures can be made therefrom within the scope of the specification and claims.

We claim:

1. A titanium trichloride/trialkyl aluminum compound catalyst for alpha-olefin polymerization modified by addition thereto of a promoter consisting essentially of 2-oxo-morpholinium halide of the formula

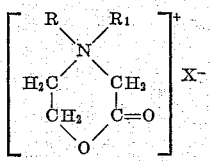

wherein R and R₁ are hydrocarbon radicals each containing from one to twenty carbon atoms, X is a halide selected from the group consisting of iodide, bromide, chloride, and fluoride, and wherein the molecular proportion of said 2-oxo-morpholinium halide per molecular proportion of trialkyl aluminum is in the range from about 1:100 to about 1:1.

2. A catalyst as defined in claim 1, wherein the titanium trichloride is alpha-titanium trichloride, and there is included as an alkyl compound, a trialkyl aluminum having 1–4 carbon atoms in each of the alkyl groups.

3. A catalyst as defined in claim 2, wherein the trialkyl aluminum is triethyl aluminum.

4. A catalyst as defined in claim 1, wherein the 2-oxo-morpholinium halide is N,N-diethyl-2-oxo-morpholinium chloride.

5. A process of modifying a titanium trichloride/trialkyl aluminum compound catalyst to promote said catalyst for the production of stereoregular polymers from alpha-olefins, which comprises admixing with said catalyst a promoter consisting essentially of 2-oxo-morpholinium halide as defined in claim 1, the molecular proportion of said morpholinium halide per molecular proportion of trialkyl aluminum being in the range from about 1:100 to about 1:1.

6. In a process of polymerizing alpha-olefins to solid polymers using as a catalyst a combination of alpha-titanium trichloride and a trialkyl aluminum compound, the improvement which comprises admixing with said catalyst a promoter consisting essentially of 2-oxo-morpholinium halide as defined in claim 1, the molecular proportion of said morpholinium halide per molecular proportion of trialkyl aluminum being in the range between about 1:5 and about 1:60.

7. The improvement as defined in claim 6 wherein the alpha-olefin possesses the general formula

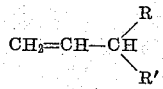

wherein R and R' are members selected from the group consisting of hydrogen, alkyl, cycloalkyl, aralkyl and aryl.

8. The improvement as defined in claim 6, wherein the alpha-olefin is propylene.

9. The improvement as defined in claim 8, wherein the titanium trichloride is alpha-titanium trichloride, and the trialkyl aluminum compound possesses 1–4 carbon atoms in each alkyl group; the molecular proportion of 2-oxo-morpholinium halide per molecular proportion of trialkyl aluminum is in the range between about 1:5 and 1:60.

10. The improvement as defined in claim 8, wherein the 2-oxo-morpholinium halide is N,N-diethyl-2-oxo-morpholinium chloride.

References Cited by the Examiner

UNITED STATES PATENTS

| | | | |
|---|---|---|---|
| 2,879,263 | 3/59 | Anderson et al. | 260—94.9 |
| 2,886,560 | 5/59 | Weber | 260—94.9 |
| 2,905,645 | 9/59 | Anderson et al. | 252—429 |
| 2,925,392 | 2/60 | Seelbach et al. | 252—429 |
| 2,932,633 | 4/60 | Juveland et al. | 260—94.9 |

FOREIGN PATENTS 526,101   5/55   Italy.

JOSEPH L. SCHOFER, *Primary Examiner.*

J. GREENWALD, *Examiner.*